United States Patent

Buda et al.

[11] Patent Number: 6,087,613
[45] Date of Patent: Jul. 11, 2000

[54] PROCESS MONITOR FOR A WELD CONTROLLER

[75] Inventors: Paul R. Buda; Jonathan H. Bailey, both of Raleigh; Larry A. Dew, Durham, all of N.C.; Robert M. Slazinski, Lake Orion, Mich.

[73] Assignee: Square D Company, Palatine, Ill.

[21] Appl. No.: 09/027,586

[22] Filed: Feb. 23, 1998

[51] Int. Cl.[7] ................................. B23K 11/24
[52] U.S. Cl. ............................................ 219/110
[58] Field of Search ........................ 219/110, 109, 219/117.1

[56] References Cited

U.S. PATENT DOCUMENTS

| 4,459,457 | 7/1984 | Jurek | 219/110 |
| 5,386,096 | 1/1995 | Buda et al. | 219/110 |
| 5,449,877 | 9/1995 | Buda et al. | 219/110 |

*Primary Examiner*—Clifford C. Shaw
*Attorney, Agent, or Firm*—Michael J. Femal; Larry I. Golden

[57] ABSTRACT

A weld controller maintains an internal dynamic model of load impedance, which tracks normal impedance variations that occur as the weld tooling degrades. The weld controller contains a weld process monitor function that tests an estimated load impedance of a weld schedule presently under execution against an internal dynamic model and generates events when characteristics of the estimated load impedance of the present weld falls outside an operator definable band, indicating a problem with the workpiece presently being welded. The weld controller further includes the capability to accept a static model of the load impedance that is used as the reference impedance for the weld control and tooling. The weld controller also includes means to declare an event when characteristics of the dynamic model differ from the static model by an operator-defined amount. The weld controller allows a distinction to be made between a short-term difference in load impedance, generally indicative of a weld process variation and the long-term difference in load impedance, generally indicative of tooling degradation. This provides for tighter controls of weld process variations than could previously be achieved, coupled with an indication of incipient tooling faults.

20 Claims, 10 Drawing Sheets

US 6,087,613

PROCESS MONITOR FOR A WELD CONTROLLER

TECHNICAL FIELD

Applicants' invention relates generally to the field of weld controllers and more particularly to a weld controller system which automatically compensates for the effects of line impedance, which cause variations in the input line voltage, to maintain a constant output RMS current to workpiece being welded by the weld controller.

BACKGROUND ART

Resistance welding is now widely used in most applications requiring the joining of metals, such as the steel used in the manufacturing of automobiles. With the advent of the microprocessor, weld controllers have become more sophisticated and use a variety of control techniques to ensure the quality of welds throughout the life of the contact tips as they wear out. Regardless of the process or control technique used, most weld controllers consist of several basic components. These include a weld control module, a power module, a weld transformer and the contact tips. The power module usually consists of power semiconductors such as silicon controlled rectifiers (SCRs) that switch incoming power to the weld transformer according to a preset weld program as generated by the control module. The weld transformer will transform the incoming power to a high current pulse that is coupled to the contact tips to create a weld to a workpiece that is between the contact tips.

It has been long recognized in resistance weld applications that the load impedance of a resistance weld contains information regarding the quality of the weld and of the condition of the tooling attached to the weld control. In a lumped parameter model of the load impedance, the load impedance can be completely characterized by determining the maximum available weld current and the load circuit power factor. Some resistance weld controllers allow the user to specify an acceptable range of allowable circuit power factor and a range of maximum available weld current as an indicator of the condition of the weld process. In operation, the weld control estimates the load circuit power factor and maximum available weld current for a given weld and compares the estimated circuit power factor to the operator specified power factor range and the estimated maximum available weld current for the weld to the operator specified maximum available weld current range, and declares an event when one or both of these ranges is exceeded. An event as defined herein indicates the satisfaction of a logical condition that has been tested by the weld controller. An example of an event is when the measured power factor falls outside the operator specified range. The reaction of the weld controller to an event can be varied and may range from doing nothing that can be observed external to the weld controller, to illuminating a lamp indicating the event, or to aborting a weld sequence in progress.

The method of specifying ranges of power factor and maximum weld current is not very intuitive and places the burden of determining the power factor range and maximum current range on the operator, and requires the operator to understand the relation between a range in power factor or maximum current and a good weld. As a minimum, this requires experimentation on behalf of the operator to determine the appropriate range of maximum available weld current and power factor in order to create a balance between detecting potentially faulty welds and creating tripping. In a typical automotive application comprising between 2000 and 4000 individual resistance spot welds, this type of experimentation is highly impractical.

U.S. Pat. Nos. 5,386,096 and 5,449,877, henceforth the '096 and '877 patents respectively, describe methods for characterizing the load that do not depend upon the system computing the system power factor and maximum current. In the weld controls described in these patents, the weld control develops an internal model of the relation between weld current and the percent of maximum available heat as the weld control progresses through a ramp of heat or current defined by a stepper program which is a program that increases the programmed heat as the number of gun closings increase from a specified point in time. This is to compensate for the flattening of the tips of the weld gun as the weld gun opens and closes, which increases the contact surface area between the tips and the workpiece, decreasing the current density and therefore the temperature at the faying surfaces. Once the weld control has gathered enough data as defined by the operator, the operator is allowed to freeze the model of the relation so developed. The user then programs limits about the model that are either an offset from the model, a specific weld current above and below the data points of the model, or a proportional limit, which develops limits that are a percentage of the data points of the model. The systems of the '096 and '877 patents provide the distinct advantage of being more intuitive and understandable to the user because it uses parameters that the user can readily relate to the weld just produced rather than computing circuit model abstractions that are difficult to comprehend.

None of any of these approaches is capable of distinguishing between the short term variations that occur from workpiece to workpiece, and the longer term variations caused by incipient breakdown of the tooling, since the load impedance as measured by the weld control contains the lumped effects of both the workpiece and the tooling. It is normal for the impedance of the tool itself to change as the weld tool ages. Individual wires in cables connecting the transformer to the weld gun fatigue and break down. Shunts break and bolts become loose. Friction between moving parts of the tool can cause the pressure exerted on the workpiece to degrade. Additionally, the maximum available current is a function of the line voltage. In order to avoid nuisance indications that would become more frequent as the tooling breaks down, it is necessary in prior art systems to choose limits that accommodate both the long-term tool breakdown and variations due to the line voltage. This compromise made in order to minimize nuisance indications due to line voltage variations and long-term tool breakdown limits the sensitivity to which prior art weld controllers can provide indications of legitimate process problems. For tooling in a new configuration in which everything is operating as designed, a wider variation in workpiece impedance is required to exceed the programmed limits than would be the case when the tool is old and in need of service whereby the overall impedance trend of the tool has caused the expected lumped impedance of an ideal workpiece and the tool itself to drift toward one of the limits.

It would be desirable to have a weld control that can track long term tool degradation and distinguish between a short term problem in an individual workpiece just welded and long term variations due to tool degradation, which would allow a more sensitive indication of weld quality without generating nuisance indications. The present invention substantially achieves these objectives, while retaining the intuitive aspects of the prior art.

SUMMARY OF THE INVENTION

Accordingly, the principal object of the present invention is to provide a weld control that develops and maintains a dynamic load impedance model which tracks the recent history of load impedance of the weld control and provides indications when the sensed load impedance differs by an operator programmable amount with respect to the dynamic load impedance model, Another objective of the present invention is to provide a weld control that compares the parametric characteristics of a present weld pulse against the dynamic load impedance model, and generates an event when the parametric characteristics of the present weld fall outside a range set by the operator, Another further objective of the present invention is to provide a weld control containing logic to update the dynamic load impedance model when and only when the characteristics of the present weld are consistent with the expected behavior, Yet another objective of the present invention is to provide a weld control that permits the operator to define a static model of load impedance, indicating the new or reference condition of the tool, and which provides a tool trend indication when the dynamic load impedance model differs from the static load impedance model by an operator programmed amount, indicating a tooling breakdown and independent of the short term part to part variations of load impedance.

In the preferred embodiment of the invention, the invention is comprised of a weld controller system of essential elements including, but not limited to, a weld control module, a power module, a weld transformer and contact tips for each phase of the polyphase voltage source. The power module consists of power semiconductors such as silicon controlled rectifiers.

The weld controller system maintains an internal dynamic model of load impedance which tracks normal load impedance variations that occur as weld tooling degrades. The weld controller contains a weld process monitor function that tests an estimated load impedance of a weld schedule presently under execution against an internal dynamic model and generates an event when characteristics of the estimated load impedance of the present weld falls outside an operator definable band, indicating a problem with the workpiece presently being welded. The weld controller further includes the capability to accept a static model of the load impedance that is used as a reference impedance for the weld controller and tooling, and is of the same format as the dynamic model. The weld controller also includes means to declare an event when characteristics of the dynamic model differ from the static model by an operator-defined amount.

The features of the weld controller allow a distinction to be made between a short-term difference in load impedance, generally indicative of a weld process variation and a long-term difference in load impedance, generally indicative of tooling degradation. This allows for tighter control of weld process variation than could previously be achieved coupled with an indication of incipient tooling faults.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention, which is not necessarily represented by such embodiment.

DETAILED DESCRIPTION

Although this invention is susceptible to embodiments of many different forms, a preferred embodiment will be described and illustrated in detail herein.

The present disclosure exemplifies the principles of the invention and is not to be considered a limit to the broader aspects of the invention to the particular embodiment as described.

Figure 1:
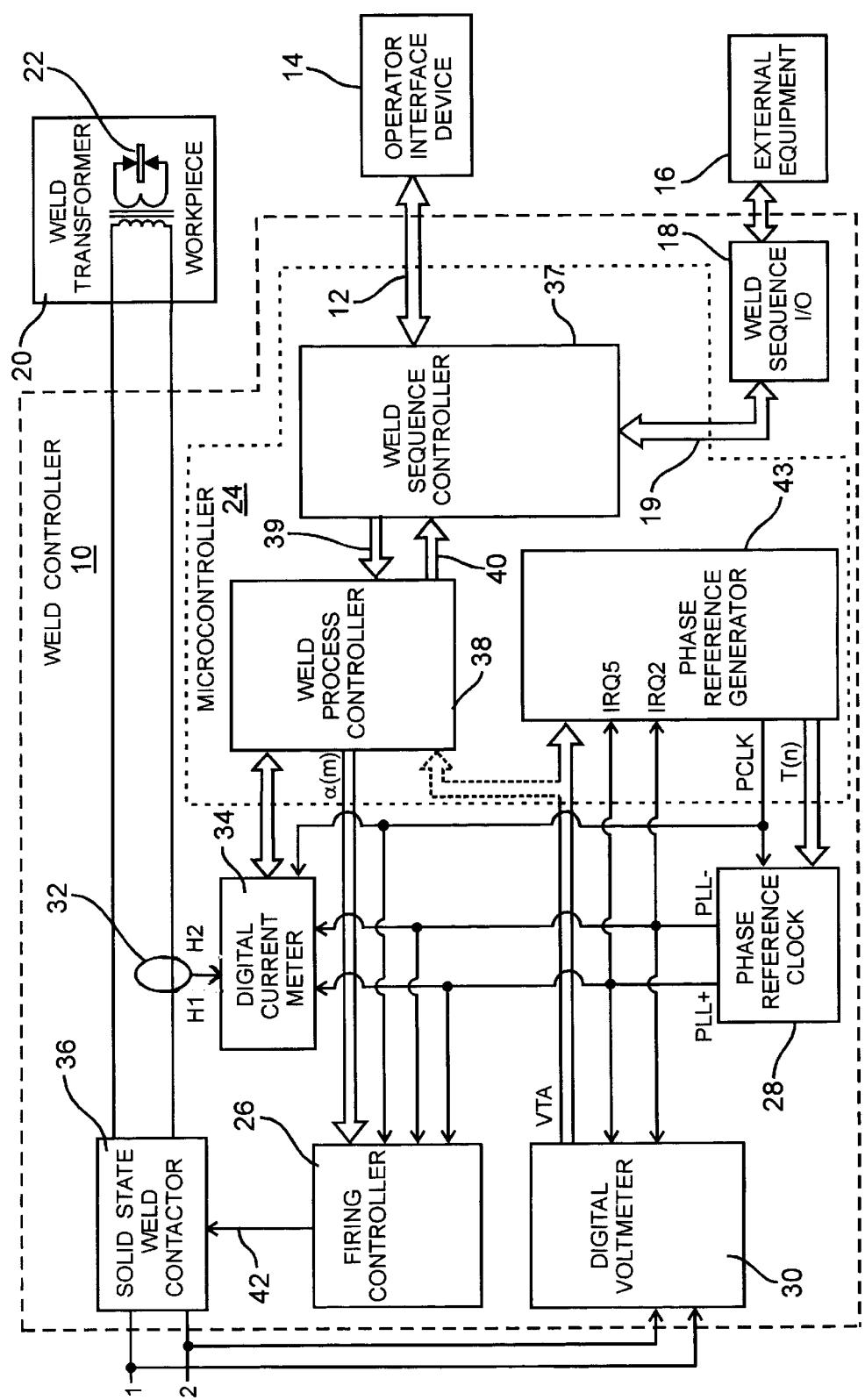
FIG. 1 is an overview block diagram of a basic weld controller system according to the present invention.

FIG. 1 shows an overview block diagram of a basic weld controller 10. A source of weld power is connected to the weld controller via the input lines L1 and L2. An external operator interface device 14 is used both to program the weld controller and to view data and status from the weld controller is connected via a serial communication link 12. Weld programs are entered and edited via an operator interface 14. The present invention supports 64 such individual weld schedules. Weld sequence I/O 18 provides a physical interface between the weld controller 10 and external equipment. An example of external equipment is an industrial robot used to position a welding gun over a part in an automotive welding application on an assembly line. The physical weld sequence I/O 18, which may take one of several forms, including individual digital inputs and outputs, or a number of commercially standard serial interfaces, is connected to the weld 10 via hardware interface 19. The output of the weld 10 is wired to a weld 20 and gun 22, which passes current through a workpiece comprising two or more pieces of metal that are to be joined.

A standard, commercially available microcontroller 24 along with associated program and data storage memory and a crystal controlled clock is the controller of the weld process and is functionally represented in FIG. 1 as a weld sequence controller 37, a weld process controller 38, and a phase reference generator 43. Functionally, the weld sequence I/O 18 is monitored and controlled by the weld sequence controller 37. The phase reference clock 28 is a free-running clock operating independent of software delays and utilizes the internal clock generated by the microcontroller 24, PCLK as its fundamental time base. The phase reference generator function 43, residing internal to the microcontroller 24, sets the period of the phase reference clock 28 through a sequence of digitally represented timing signals T(n) that set the instantaneous period of the phase reference clock 28. The phase reference clock 28, in turn, generates two timing signals, PLL+ and PLL- which are fed back as interrupts IRQ5 and IRQ2 to the microcontroller, where they trigger initiation of the phase reference generator function 43. Digital voltage meter 30 is used to measure various parameters of the input line voltage L1–L2, such as volt-time area, and polarity. The digital voltmeter 30 is synchronized with the phase reference clock via the signals PLL+ and PLL-. The phase reference generator 43 monitors the parametric data generated by the digital voltmeter 30 and uses the information developed by the digital voltmeter 30 to generate a sequence of digitally represented timing periods T(n) to the phase reference clock 28.

A current sensor 32 generates a current signal H1, H2 proportional to the current flowing in the primary of the weld transformer 20. A digital current meter 34 is used to measure various parameters of the primary load current, such as current-time area, polarity, and conduction time. The digital current meter 34 uses the signal PCLK for the time base by which conduction time is measured, and measurements are synchronized with the digital voltmeter, phase reference clock and microprocessor via the PLL+ and PLL- signals.

The firing controller 26 accepts the firing command signals from the microcontroller 42 in the form of digitally represented time delays, which are counts of the PCLK, and is synchronized with the phase reference clock 28, digital voltmeter 30, digital current meter 34 and phase reference generator via the signal PLL+, and uses the signal PCLK for the time base by which firing pulses 42 to the solid state weld contactor 36 are generated. The solid state weld contactor 36 switches line voltage upon command in the form of the firing pulses 42 from the firing controller. This solid state contactor generally comprises a pair of back to back thyristors with associated snubbing, level shifting and pulse shaping circuits required to accept the firing pulses.

Details of the phase reference clock 28, the digital voltmeter 30, the phase reference generator function 43, the digital current meter 34 and the firing controller 26 are disclosed in commonly assigned U.S. patent application Ser. No. 08/866,829, filed May 30, 1997, and entitled "Phase Distortion Compensated Time Base for a Weld Controller", the details of which are incorporated herein by reference.

Data to and from the operator interface device 14 is monitored and managed by the weld sequence controller function 37 implemented in the microcontroller 24. A basic data structure within the weld 10 is a weld schedule, which includes a weld program indicating to the weld control the desired steps to be followed when the schedule is initiated and associates the schedule with one of a number stepper boost programs, which are user programmable and allow the user to boost the weld current as a function of the number of times the particular weld tool has been exercised since a reference time, also designated by the operator. Weld programs are entered and edited via the operator interface 14. Weld sequence I/O 18 provides the physical interface between the weld controller and external equipment 16 and is monitored and controlled by the weld sequence controller 37.

Once a program is entered into a weld schedule via the operator interface device 14 and selection of a weld schedule and execution of the weld program is initiated via external equipment 16 through weld sequence I/O 18, the weld sequence controller analyzes the weld program and issues weld pulse commands 39 to the weld process controller 38. Each weld pulse command 39 corresponds to an individual weld instruction in the weld program presently selected and under execution. The weld process controller 38 executes the weld pulse commands in order and uses a combination of the weld command parameters, an internal dynamic I-γ model of the expected load impedance generated from historical data from the schedule presently selected, and data gathered from the digital current meter and digital voltmeter in a closed loop feedback system to γ generate the sequence of timing signals 42 used by the firing controller 26 to trigger the solid state weld contactor 36. The data gathered is in the process of generating the weld pulse is also collected and analyzed in a manner that is the subject of this patent application and is to be described subsequently. The weld process controller 38 communicates weld data and weld status 40 back to the weld sequence controller 37, which then determines the appropriate action to take, such as communicating the weld data to the operator interface device 14 on demand. Examples of weld data are the measured weld current, weld voltage, firing angles, conduction angles, power factor and percentage of maximum current used. Examples of weld status are known as events, which are generated when certain logical conditions are satisfied. The weld sequence controller 37 analyzes the events, and determines the appropriate actions to take based on the specific event, and information entered via the operator interface.

Two weld types are supported in the present invention—a % I weld which adjusts thyristor firing timing relative to the weld power source appearing on L1 and L2 to regulate a voltage and line impedance compensated conduction angle representing a percentage of maximum weld current into an assumed load impedance, and a constant current weld which adjusts the thyristor firing angles to achieve a target current directly. Other forms are possible and the present invention is not to be restricted to either the % weld or constant current type. The general forms of % I weld commands as seen on the screen of operator interface 14 is either XX~Weld @ YY % I or XX~SLOPE FROM Y1% I to Y2% I Where XX denotes the number of full cycles of the input power source and YY % I, Y1% I and Y2% I indicate a percentage of the maximum available current as defined by the estimated load impedance as stored in the I-γ table. The first form of the % I command is intended to deliver a constant weld pulse of XX cycles at YY percent of maximum controllable current, the term maximum controllable current to be defined subsequently. The second form is intended to ramp the weld current from Y1 to Y2 percent of maximum controllable current linearly over XX cycles of weld.

The general forms of constant current weld commands in the present invention as seen on the screen of operator interface 14 are XX~WELD @ YY AMPS
    XX~WELD @ YY kA
    XX~SLOPE FROM Y1 AMPS TO Y2 AMPS
    XX~SLOPE FROM Y1 kA to Y2 kA The first form of the command attempts to deliver a weld current of YY Amperes RMS to the primary of the weld transformer over a period of XX cycles. The second form allows the user to program the desired secondary current (in kilo-Amperes), which the weld 10 subsequently converts to primary amperes from a knowledge of the weld transformer turns ratio (a value that is entered by the user via the Operator Interface). Similarly, the third form of the weld command above attempts to create a linear ramp of weld current from Y1 Amperes to Y2 Amperes over a period of XX cycles, and the forth command allows the user to specify the weld current targets for the linear ramp in secondary kilo-Amperes, which are subsequently converted by the weld control to primary amperes as above.

Figure 2:
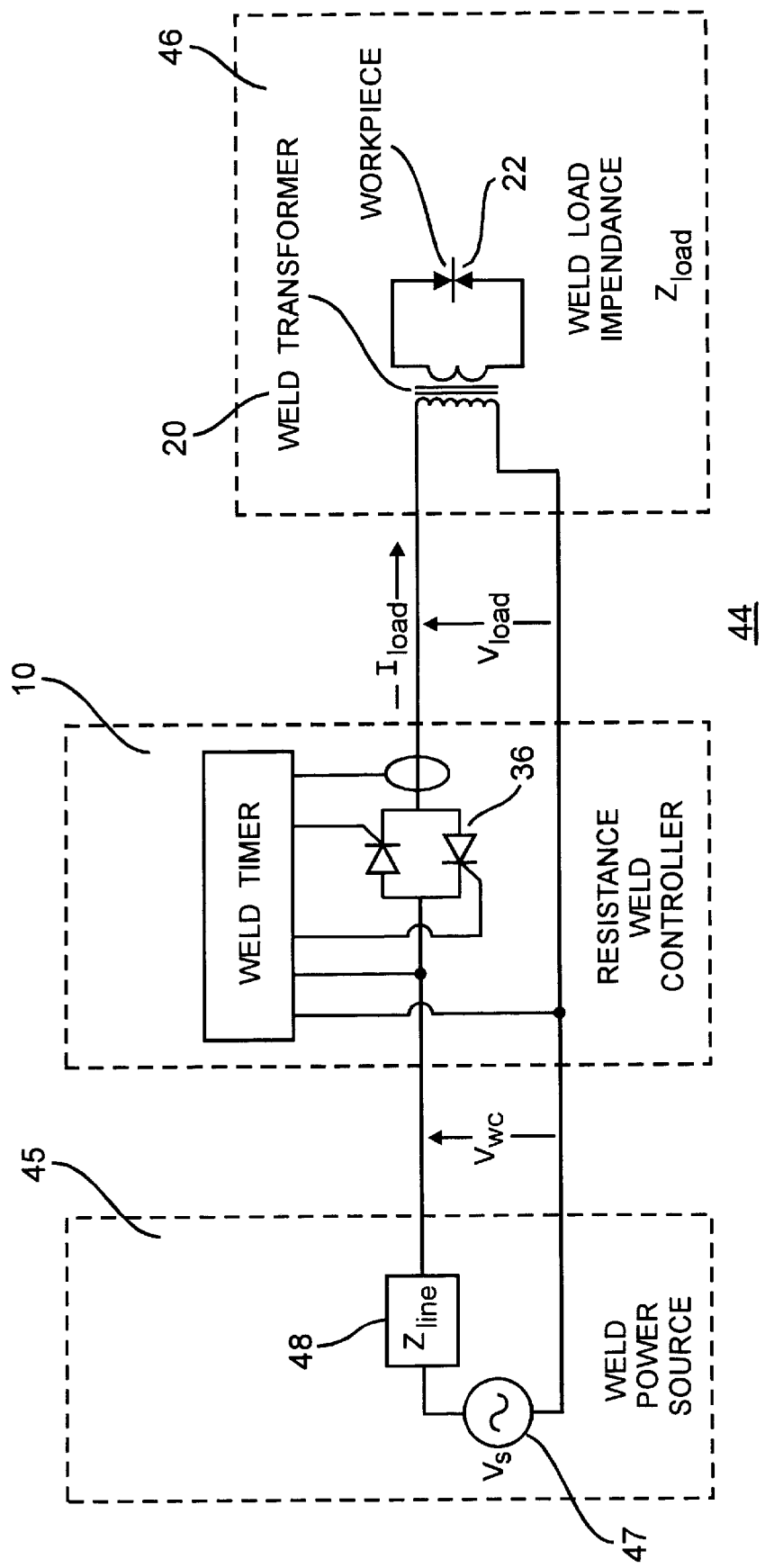
FIG. 2 is a simplified lumped parameter circuit model for a typical resistance weld controller system, and associated power distribution system and weld load.

FIG. 2 is a simplified lumped parameter circuit model 44 for the resistance weld controller 10, and associated power distribution system and weld load which is used to derive mathematics for the weld controller 10. The lumped parameter model 44 comprises a weld power source 45, the weld 10 and a weld load impedance 46. The weld power source 45 is modeled as two circuit elements, a voltage source 47, assumed to be an ideal voltage source having no series impedance and a serially connected lumped line impedance, $Z_{line}$ 48, which is assumed to be ideal and linear and which generates a voltage drop between the ideal voltage source and the weld control proportional to the weld load current. The weld 10 is capable of observing the load current $I_{load}$ and the voltage applied at its input terminals, $V_{wc}$. Utilizing thyristor based phase control, the weld 10 generates a weld voltage $V_{load}$ at its output terminals, with a corresponding weld current $I_{load}$. The weld load impedance 46 comprises the weld transformer 20, workpiece, tooling 22, fixtures and other sources of impedance. To simplify the mathematics, the impedance of all these elements are lumped into a single impedance quantity reflected at the output terminals of the weld control as $Z_{load}$. When the weld 10 applies the voltage $V_{load}$ upon the load impedance, the resulting current is $I_{load}$.

The relationship between thyristor voltage and current when conducting into an inductive load, as in the case in a normal resistance weld application, is well known. In order to maintain independence of frequency in the discussion that follows, the sinusoidal voltage source is scaled in degrees instead of in time. With the sinusoid defined in degrees, the thyristor is fired at an angle α with respect to the phase reference clock which nominally tracks the zero crossings of the sinusoidal voltage source, at which time the thyristor begins to conduct current. The relationship between the line voltage and line current while conducting is proportional to:

$$i(\phi) = \begin{cases} 0 & 0 < \phi < \alpha \\ e^{-\left(\frac{\phi-\alpha}{\tan(\theta)}\right)}\sin(\alpha - \theta) + \sin(\phi - \theta) & \alpha \le \phi \le \alpha + \gamma \\ 0 & \phi > \alpha + \gamma \end{cases} \quad (1)$$

where φ is the angle of observation, α is the angle with respect to the zero crossing of the line voltage at which the thyristor is fired, θ is the lag angle of the load and γ is the conduction angle of the thyristor, the smallest angle for which $$e^{-\left(\frac{\alpha+\gamma}{\tan(\theta)}\right)}\sin(\alpha - \theta) + \sin(\alpha + \gamma - \theta) = 0, \gamma > 0 \quad (2)$$

is satisfied. The lag angle of the load impedance, θ in Equation (1), is related to the circuit power factor, pf, by:

θ=arccos(pf)

Figure 3:
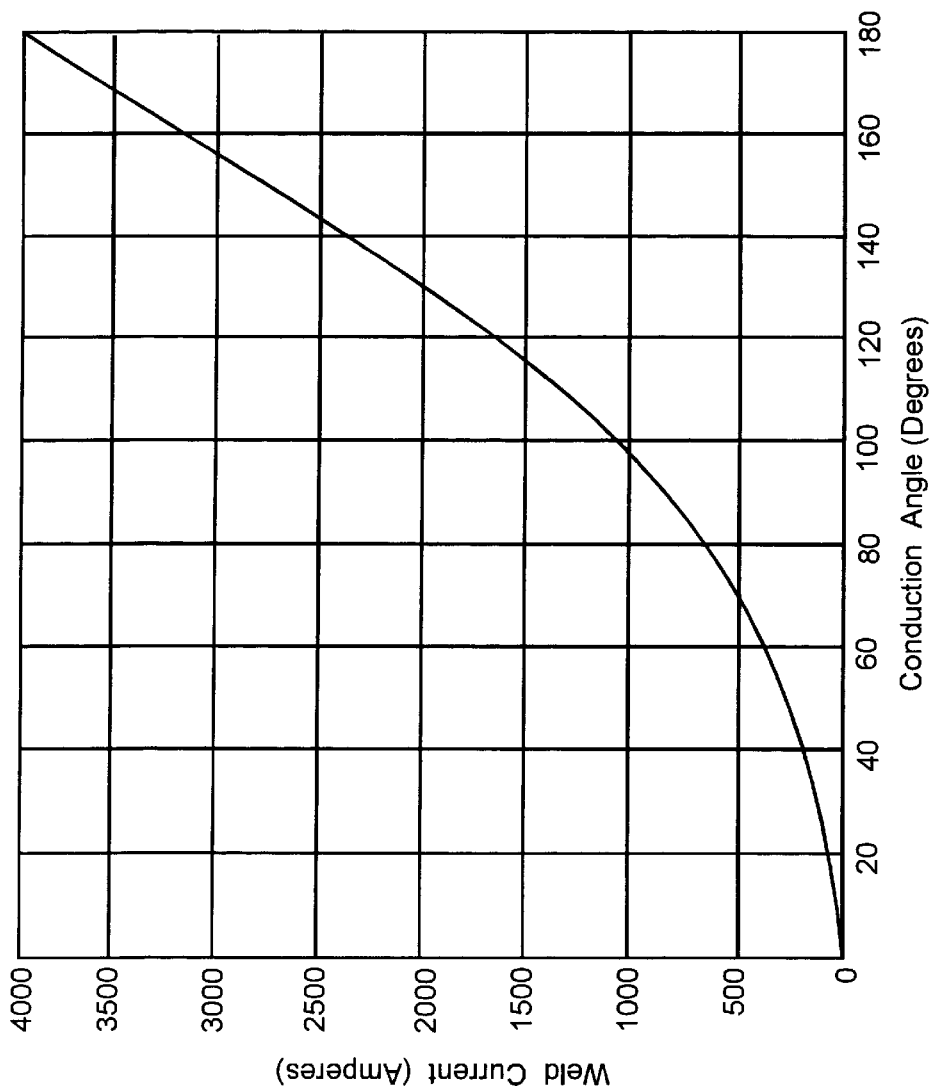
FIG. 3 shows an I-$\gamma$ model for a load with a power factor of 30% and a maximum current, which would be incurred at an 80 degrees conduction angle for a typical resistance weld controller.

The present invention is designed to operate at a nominal reference line voltage $V_{nom}$, typically 480 VAC in the United States, or 380 VAC in Europe or Japan. Other voltage ratings are also possible and are not to be a limitation of the present invention. Referencing the lumped parameter model 44 of FIG. 2, for a normalized ideal source of weld voltage 47 of nominal value, $V_S=V_{nom}$ containing no line impedance 48 and welding load impedance 46 that is inductive in nature, a relation can be drawn between conduction angle and RMS weld current resulting from a half-cycle of conduction of the thyristor that completely characterizes the lumped load impedance. Such a relation is henceforth referred to as an I-γ model for the load impedance. FIG. 3 shows the I-γ model for a load with a power factor of 30% and a maximum current, which would be incurred at full conduction of the thyristor (at 180 degrees conduction angle), of 4000 Amperes. Given FIG. 3, and a desired weld current, the conduction angle required to achieve the desired current can be determined from the graph. In the present invention, an I-γ model is represented as a vector of 19 data points, with each data point representing the weld current from 0 to 180 degrees at increments of 10 degrees Associated with each weld schedule is static I-γ model, henceforth SIG(m), with m the schedule number. This static I-γ model is intended to represent the reference characteristic of the tool and workpiece under the weld schedule and is set in a manner to be described subsequently. Also associated with each weld schedule is a dynamic I-γ model, DIG (m), which is maintained by the weld controller and tracks the behavior of the weld tool and workpiece under normal circumstances, again in a manner to be discussed subsequently. To determine the conduction angle associated with a given weld current, or the converse, the present invention utilizes the I-γ model as represented with linear interpolation between the individual stored values of SIG(m) or DIG(m).

Figure 4:
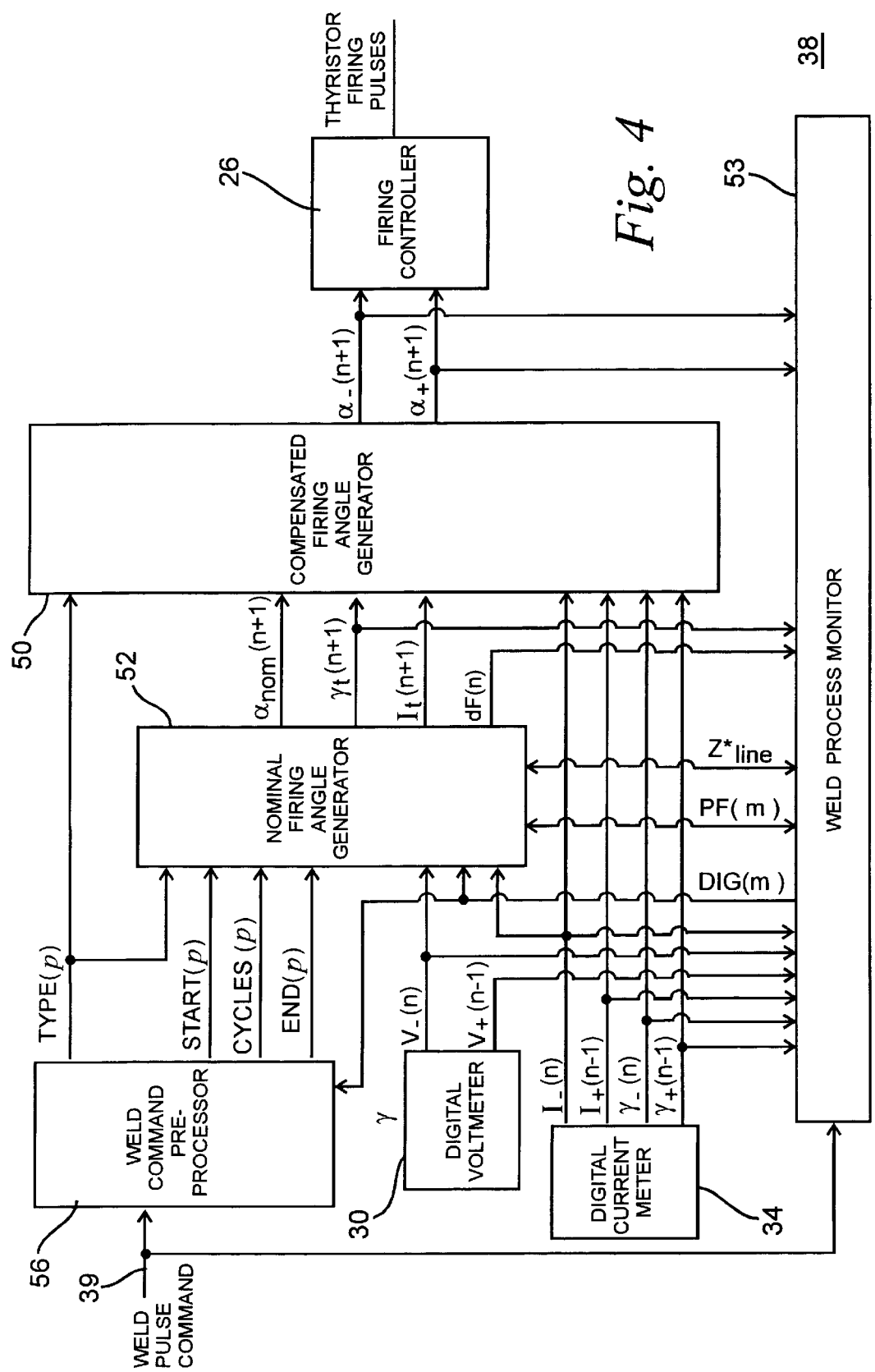
FIG. 4 provides a more detailed functional description of the weld process controller of the basic weld controller system of FIG. 1.

With the notion of an I-γ model of load impedance established, FIG. 4 provides a more detailed functional description of the weld process controller 38.

It should be noted that FIG. 4 is a functional representation of the weld process control and does not imply that the weld software is organized into specific software modules to perform the function described. Weld pulse commands 39 from the weld sequence controller furnish data to a weld command preprocessor function 56 and a weld process monitor function 53. The weld command preprocessor function 56 also accepts the dynamic I-γ model DIG(m) for weld schedule m, presently under execution, from a weld process monitor function 53. The weld command preprocessor function 56 derives information from the Pth weld pulse command of schedule m as programmed by an operator, including a starting target value, StartI(p,m), of primary current for this pth pulse of weld schedule m, an ending target value, EndI(p,m), of primary current for this pth pulse of weld schedule m, the number of cycles Cycles(p,m) of weld in this pth pulse of weld schedule m, and the weld type (% I or CCWELD), labeled Type(p,m) for this pth pulse of weld schedule m. In the case of a Constant Current weld, preprocessing involves converting any secondary current values entered into primary currents (using the specified transformer turns ratio) and extracting the information above. In the case of a % I weld, programmed percentages are converted into target primary currents by multiplying the user programmed percentage by $I_{170}$, the expected current from the dynamic I-γ model DIG(m) that would be supplied by the weld control into the nominal estimated load at nominal designed voltage at a conduction angle of 170 degrees. StartI(p,m), EndI(p,m), Cycles(p,m) and Type(p,m) are all inputs to the nominal firing angle generator function 52, and Type(p,m) is also an input to the compensated firing angle generator 50 to be described subsequently.

A weld process monitor function 53 maintains an estimate of the line impedance $Z_{line}$, the present value of the dynamic I-γ model for the present weld schedule, DIG(m) and an a-priori estimate of the load power factor for the present weld schedule PF(m) to the nominal firing angle generator 52. The digital voltmeter function 30 furnishes provides estimates V_(n) and V_+(n) of the RMS line voltage for the negative and positive half cycles of each cycle of line voltage V_(n) is furnished to the nominal firing angle generator 52, and V_(n) and V_+(n) are both furnished to the weld process monitor function 53. The digital current meter function 34 furnishes an estimated sequence I_(n) of the RMS current for each negative half cycle, to both the nominal firing angle generator 52 and compensated firing angle generator 50, as well as furnishing the sequence of estimated positive half-cycle current, I_+(n−1), the negative conduction angle sequence, γ−(n) and positive conduction angle sequence γ+(n−1) to the compensated firing angle generator 50 and the weld process monitor 53. The sequence (n−1) implies that this data is delayed a full cycle of line voltage, a physical limitation of the system.

With the inputs as given above, the nominal firing angle generator 52 provides a sequence of nominal firing angles, $\alpha_{norm}(n+1)$, a voltage and line impedance compensated target conduction angle sequence, $\gamma_t(n+1)$ and a target current sequence, $I_t(n+1)$ to the compensated firing angle generator 50 derived from its inputs. The target firing angle sequence, $\gamma_t(n+1)$ is also an input to the weld process monitor 53. The sequence (n+1) is the target sequence for the next cycle. Another output of the nominal firing angle generator 52 is a sequence dF(n), which is fed to the weld process monitor 53 and which indicates the half cycles of the target weld sequence that have been delayed fired, a process in which the firing angles of the first and last half cycles are limited to a minimum value to minimize the possibility of weld transformer saturation.

The compensated firing angle generator 50 uses the data provide by the nominal firing angle generator 52 described above as well as the sequences I_(n), I_+(n−1), γ_(n) and γ_+(n−1) from the digital current meter 34 to develop a sequence of positive half-cycle firing angles, $\alpha_+(n+1)$ and a sequence of negative half-cycle firing angle values $\alpha_-(n+1)$ to the firing controller 26, which outputs of the sequence of electrical impulses that trigger the thyristor, causing weld current to flow.

Figure 5:
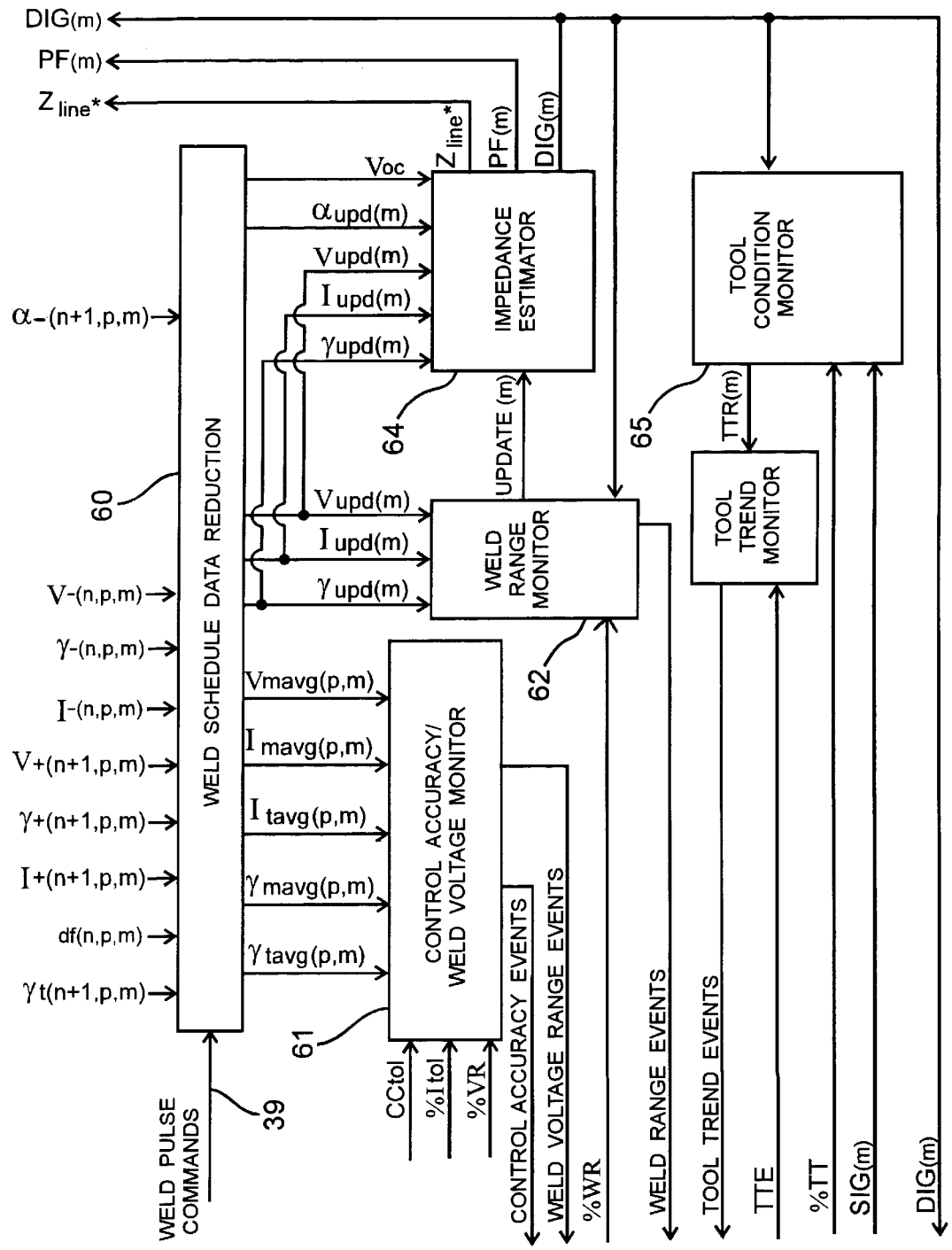
FIG. 5 shows a functional block diagram of the weld process monitor of the basic weld controller system of FIG. 1.

FIG. 5 shows a functional block diagram of the weld process monitor 53. A weld schedule data reduction function 60 accepts the target conduction angle sequence $\gamma_t(n+1)$ and the delayed fired flag dF(n) from the nominal firing angle generator 52, the measured weld current sequences I_(n) and I_+(n−1) and measured weld conduction angle sequences γ_(n) and γ+(n−1) from the digital current meter function 34, the sequences V_+(n+1) and V_(n) from the digital voltmeter function 30 and the sequence of negative half cycle firing angles, $\alpha_-(n+1)$ from the compensated firing angle generator function 50 as inputs. It also accepts weld pulse command 39 from the weld sequence controller 37.

The weld schedule data reduction function 60 computes the average measured conduction angle, $\gamma_{mavg}(p,m)$ of all non delayed fired half cycles of the S Pth weld pulse of weld schedule m, the average measured weld current $I_{mavg}(p,m)$ of all non delayed fired half cycles for the pth weld pulse of weld schedule m and the average measured line voltage $V_{mavg}(p,m)$ of the $P_{th}$ weld pulse of weld schedule m, as well as the average target conduction angle $\gamma_{tavg}(p,m)$ for the pth weld pulse of weld schedule m. Using information derived directly from the weld command pulse data 39, furnished by the weld sequence controller 37, the weld schedule data reduction function 60 computes the average target weld current $I_{tavg}(p,m)$ for each non slope weld pulse of weld schedule m, presently under execution. The other outputs of the model update data generator 62 are an update conduction angle $\gamma_{upd}(m)$, update weld current, $I_{upd}(m)$, update firing angle $\alpha_{upd}(m)$, update weld voltage $V_{upd}(m)$ all corresponding to the measured values of the last half cycle of the last weld pulse in weld schedule m, just completed, and the measured value of line voltage from the last negative half cycle in which no weld current flowed prior to execution of the present weld schedule m, labeled $V_{oc}$ in FIG. 5.

The values of $\gamma_{tavg}(p,m)$, $\gamma_{mavg}(p,m)$, $I_{mavg}(p,m)$ ). $I_{tavg}(p,m)$, and $V_{mavg}(p,m)$, produced by the weld pulse data reduction function 60 for each pulse p in weld schedule m are inputs to the weld control accuracy and voltage monitor function 61, which determines whether the weld control was able to meet its target control objectives for either current or conduction angle, dependent upon the weld type, and whether the weld voltage for the pulse was within a user specified tolerance of the nominal design voltage $V_{nom}$. Two user entered parameters CCtol and % Itol, which are machine constants entered by the operator via the operator interface device 14 are inputs to the weld control accuracy and voltage monitor function 61 defining the allowable percentage deviation in current and conduction angle respectively between the target and measured weld current in a Ccweld and a % Iweld respectively. Another machine constant, % VR, which can be set by the operator using the operator interface function 14, defines the allowable percent deviation between the measured weld voltage and the nominal s voltage $V_{nom}$. The outputs of the weld control accuracy and voltage monitor function 61 are control accuracy events, and weld voltage range events which are sent to the weld sequence controller 37 for subsequent processing as part of weld status 40.

The schedule update conduction angle $\gamma_{upd}(m)$, weld current, $I_{upd}(m)$ and weld voltage $V_{upd}(m)$ are inputs to a weld range monitor function 62, which determines if the load impedance of the present weld is consistent with the present dynamic I-γ model. The operator specified value of a parameter, % WR, is also furnished to the weld range monitor 62, as is the present value of the dynamic I-γ model for the weld schedule, DIG(m), which is maintained by an impedance estimator function 64 to be described subsequently. The outputs of the weld range monitor function 62 are weld range events, the logical conditions for which will be described subsequently, and which are transmitted back to the weld sequence controller 37 as part of weld status 40, and a command sequence shown in FIG. 5 as UPDATE(m) to the impedance estimator function 64 indicating a request to update DIG(m) as appropriate in a manner to be described subsequently. The weld range events indicate that the observed load impedance characteristics of the present weld schedule are not consistent with the present dynamic I-γ model, indicating a radical short term change in the load impedance, which is usually associated with a variation in the workpiece.

The impedance estimator function 64 maintains an estimate of the parametric values of line and load impedance for the lumped parameter model of FIG. 2. Inputs to the impedance estimator function 64 are $\gamma_{upd}(m)$, $\alpha_{upd}(m)$, $I_{upd}(m)$, $V_{upd}(m)$ and $V_{oc}$, all furnished by the weld schedule data reduction function 60, and the UPDATE(m) command sequence furnished by the weld range monitor function 62. The outputs of the impedance estimator function, 64 are the estimate of line impedance Zline , the present estimate of load impedance power factor for each weld schedule, PF(m) and the present dynamic I-γ model, DIG(m). Details of each of these processes managed by the impedance estimator function will be discussed subsequently.

DIG(m) is also furnished to a tool condition monitor function 65 in FIG. 5, and which executes subsequent to an update of the impedance estimator function 64. The tool condition monitor function also accepts a static I-γ structure for each weld schedule, labeled SIG(m) in FIG. 5 and the value of a tool trend machine constant parameter % TT. The operator through the operator interface 14 sets the value of % TT. The values of SIG (m) and % TT are furnished to a tool trend monitor 66 by the weld sequence controller 37. Simply stated, the tool condition monitor compares each point of the dynamic I-γ model, DIG(m) against the corresponding point SIG(m) of the static I-γ model for the schedule to be updated, and sets a tool condition flag whenever any point in DIG(m) lies outside a range of the corresponding point in SIG(m), the range specified by the percentage % TT. This indicates whether the trend of the present load impedance as indicated by the dynamic I-γ model differs from the reference load impedance as specified by the static I-γ model. The output of the tool condition monitor is a tool trend flag for each schedule, TTR(m), which is passed to the tool trend monitor function 63.

The tool trend monitor 63 synchronizes the output of the tool condition monitor, TTR(m) with the other process monitoring events, setting a corresponding tool trend event if the tool trend flag is set for the schedule. Tool trend events can be enabled or disabled via the operator interface. The weld sequence controller 37 to indicate whether tool trend events should be reported furnishes the signal tool trend enable TTE.

Each weld program in a weld schedule has a mandatory HOLD instruction automatically inserted as the last executable instruction in the weld program. The nominal function of the HOLD instruction is to maintain gun pressure on the workpiece while the fused weld nugget solidifies. The operator can program the number of cycles of HOLD desired, but a minimum of one cycle is required of the weld controller enable the process monitor function 53 to complete its work and issue any events back to the weld sequence controller. Once the weld control is in the process of executing the HOLD instruction the weld control software tests the data collected from the weld pulses pulse to determine if the control has adequately met its target objectives for the weld. When the HOLD instruction is encountered in a weld schedule, and once all of the data necessary to compute the outputs of the weld schedule data reduction function is available, the individual monitor functions of the weld process monitor are executed as described below.

Figure 6:
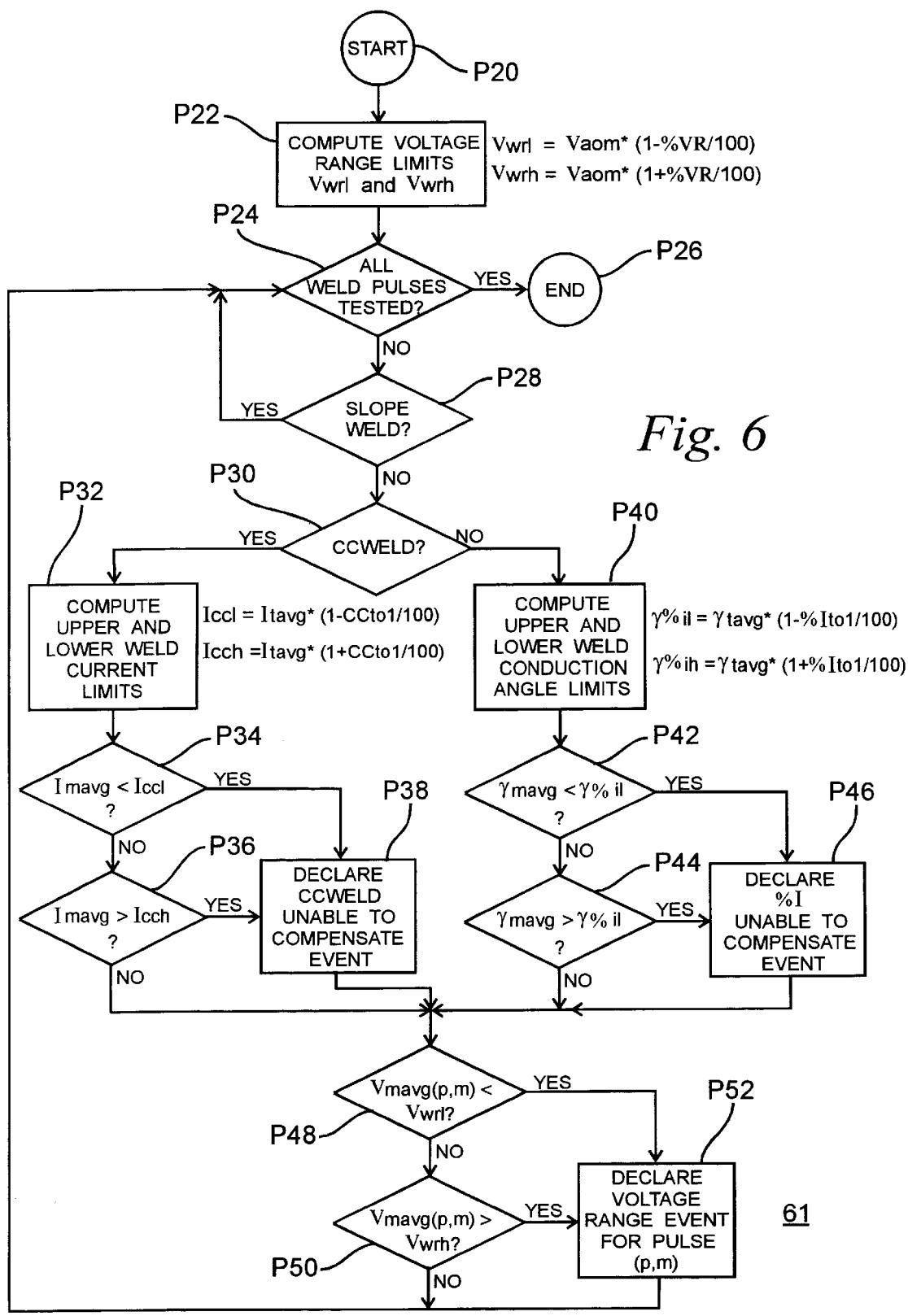
FIG. 6 is a flow chart illustrating the method used by the control accuracy and weld voltage monitor of FIG. 5 to determine control accuracy events and voltage events from its input data.

FIG. 6 is a flow chart showing how the control accuracy and weld voltage monitor 61 determines control accuracy events and voltage events from its input data. This function is executed in its entirety during the first full cycle of the HOLD instruction, and after all of the required data to execute has been generated by the weld schedule data reduction function 60. Upon entry into the routine at P20, the software routine first computes the lower and upper voltage range limits, $V_{wrl}$ and $V_{wrh}$ in step P22 using $$V_{wrl} = V_{nom} * \left(1 - \frac{\% VR}{100}\right) \text{ and} \tag{4}$$

$$V_{wrh} = V_{nom} * \left(1 + \frac{\% VR}{100}\right) \tag{5}$$

where $V_{nom}$ is the nominal design voltage for the weld control, a machine constant, and % VR is the operator specified weld voltage range percentage. Next, the routine determines in P24 whether all weld pulses contained in schedule m, presently under execution have been analyzed. It is possible that the weld schedule contains no weld pulses, or that passage of current was disabled in a mode entitled NOWELD. If all weld pulses in the schedule have s been analyzed, the routine is complete and ends at P26. Assuming there are still pulses remaining in the schedule to be analyzed, in P28 the routine tests to determine if the next weld pulse is a slope weld. In the present implementation, the control accuracy of slope welds is not tested, and control passes back to step P24. That the present implementation does not test the data gathered from slope welds should not to be construed to be a limitation of the invention; slope welds would be tested in an identical manner. Assuming there are weld pulses remaining in the schedule to be tested in P24, and that the next weld pulse is not a slope weld P28, a determination of the weld type is made in P30. A weld pulse is either a constant current pulse or a % I pulse.

If the present weld pulse under examination is a constant current weld pulse, the average target weld current, $I_{tavg}$(p, m), for the present weld pulse in the weld schedule presently being executed is the programmed weld current plus any boost incurred by the stepper program, and is furnished directly by the weld sequence control 37 as part of a weld pulse command 39. In step P32, the software computes the lower and upper weld current limits for the weld, $I_{ccl}$ and $I_{cch}$ respectively pulse based on $I_{tavg}$ using:

$$I_{ccl} = I_{tavg} * \left(1 - \frac{CCtol}{100}\right) \text{ and} \tag{6}$$

$$I_{cch} = I_{tavg} * \left(1 + \frac{CCtol}{100}\right) \tag{7}$$

where CCtol is a user supplied parametric value, entered via the operator interface 14 and indicates the maximum allowable percentage difference between the average target weld current and the average measured weld current. CCtol is a machine constant. If the condition $$I_{mavg} < I_{ccl} \tag{8}$$

is satisfied in step P34 or the condition $$I_{mavg} > I_{cch} \tag{9}$$

is satisfied in step P36, control passes to P38, a CCWELD unable to compensate event is declared for that weld pulse, and control passes to step P48. This CCWELD unable to compensate event is one type of control accuracy event sent back to the weld sequence controller 37. If neither conditions in (8) or (9) is satisfied no action is taken on the weld pulse and control passes immediately to P48 with no control accuracy event declared on the present weld pulse.

If the weld type was determined to be a % I Weld in step P30, the lower and upper weld conduction angle limits are computed in step P40 from the average target weld conduction angle $\gamma_{tavg}$(m) using:

$$\gamma_{\%il} = \gamma_{tavg} * \left(1 - \frac{\% Itol}{100}\right) \text{ and} \tag{10}$$

$$\gamma_{\%ih} = \gamma_{tavg} * \left(1 + \frac{\% Itol}{100}\right) \tag{11}$$

Where the value of % Itol is a user supplied parametric value, entered via the operator interface 14, and indicates the allowable percentage difference between the average target conduction angle and the average measured conduction angle for the weld pulse. % Itol is a machine constant. If the condition $$\gamma_{mavg} < \gamma_{\%il} \qquad (12)$$

is satisfied in step P42, or the condition $$\gamma_{mavg} > \gamma_{\%ih} \qquad (13)$$

is satisfied in step P44, control passes to P46 where a % I Unable to Compensate Event is declared for that weld pulse. The % I Unable to Compensate Event is one of the control accuracy events transmitted back to the weld sequence controller 37. After declaring the % I unable to compensate event, control passes to step P48. If neither conditions (12) or (13) above are satisfied, no control accuracy event is declared on the present weld pulse and control passes immediately to step P48.

In the condition $$V_{avg}(p,m) < V_{wrl} \qquad (14)$$

is satisfied in step P48, or the condition $$V_{avg}(p,m) > V_{wrh} \qquad (15)$$

is satisfied in step P50, control passes to step P52, where a voltage range event is declared for pulse P of schedule m. Control then passes back to step P24 where the process continues. The weld voltage range event is communicated for weld pulse p of schedule m is communicated back to the weld sequence controller 37 as part of weld data and status 40. If neither condition (14) or (15) are satisfied, no voltage range event is declared for pulse p of schedule m, and control passes to P24 where processing continues per above.

Figure 7:
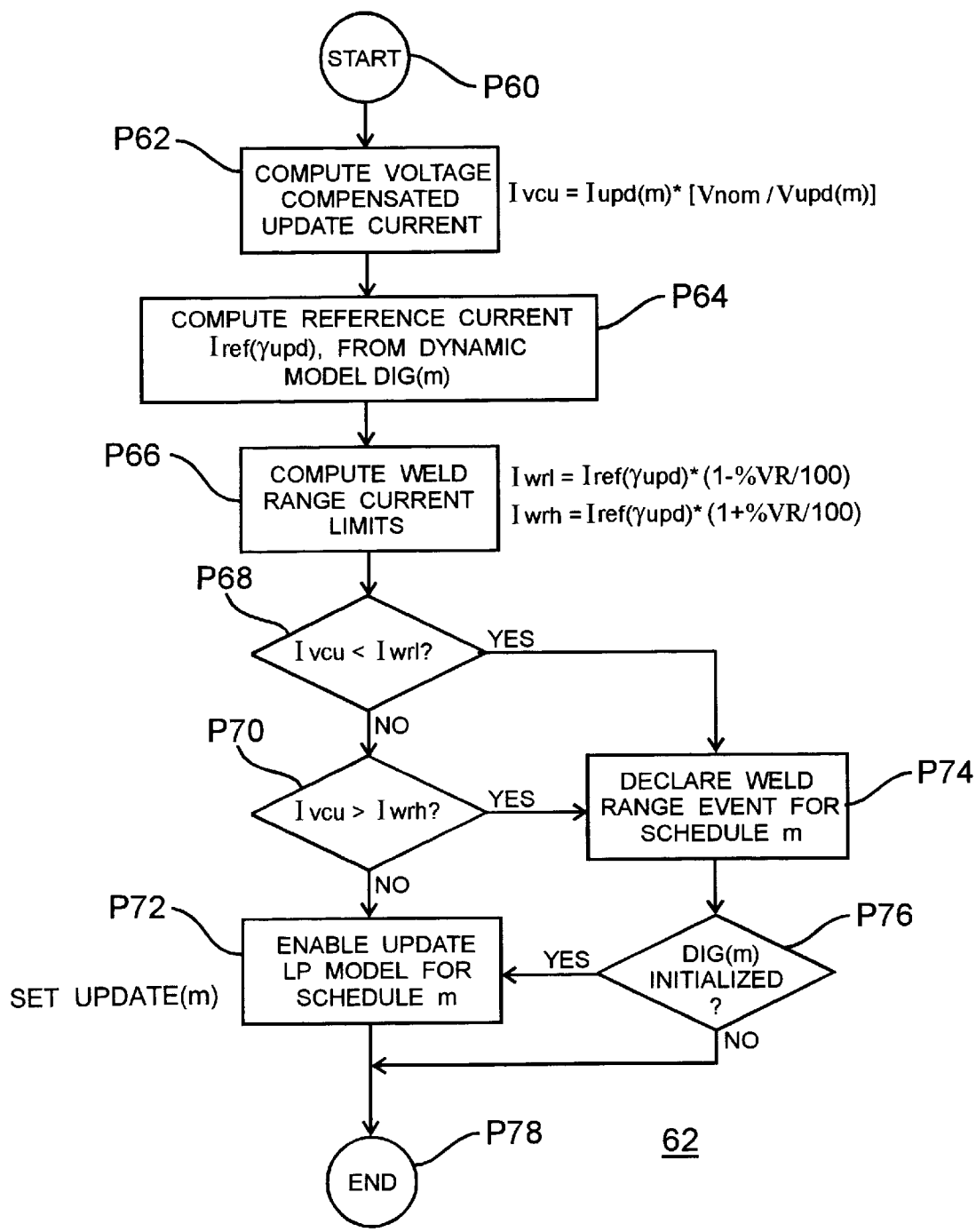
FIG. 7 is a flow chart showing the operations performed by the weld range monitor of FIG. 5 to determine if the present weld varies significantly from other welds made using a recent weld schedule.

FIG. 7 is a flow chart showing the operations performed by the weld range monitor 62, which determines if the present weld varies significantly from other welds made using weld schedule m recently. This routine is executed during the first cycle of the HOLD instruction of the weld schedule, and after all data required has been generated by the weld schedule data reduction function 60. The dynamic I-γ model stored internal to the weld control for each weld schedule DIG(m) is normalized to a nominal designed line voltage, $V_{nom}$. Upon entry to the routine in step P60, in order to determine if the update weld parameter set $\gamma_{upd}(m)$ and $I_{upd}(m)$ supplied by the weld schedule data reduction function 60 are consistent with the present dynamic I-γ model for the weld schedule as represented by DIG(m), in step P62 $I_{upd}(m)$ is scaled to obtain a voltage compensated update current, $I_{vcu}$ using:

$$I_{vcu} = I_{upd}(m) \frac{V_{nom}}{V_{upd}(m)} \qquad (16)$$

In step P64, the reference current $I_{ref}$ corresponding to the update conduction angle $\gamma_{upd}(m)$ is computed using the dynamic I-γ model, DIG(m) for the selected weld schedule. As stated earlier, in the present invention, DIG(m) comprises 19 data points representing the relation between weld current and weld conduction angle over the range of conduction angle between 0 and 180 degrees and at intervals of conduction angle of 10 degrees. To determine the reference current $I_{vcu}$ corresponding to the measured conduction angle, linear interpolation is performed between data points in the dynamic I-γ model. $I_{ref}$ represents what the weld current corresponding to the given conduction angle $\gamma_{upd}(m)$ should be if the load impedance of the present weld is similar to those in the recent past.

Once the reference current corresponding to the measured update conduction angle, $I_{ref}$, is computed, the allowable range of weld current about that reference current is computed in step P66 by computing lower and upper current limits, $I_{wrl}$ and $I_{wrh}$ respectively using:

$$I_{wrl} = I_{ref}(\gamma_{upd}) * \left(1 - \frac{\% WR}{100}\right) \text{ and} \qquad (17)$$

$$I_{wrh} = I_{ref}(\gamma_{upd}) * \left(1 + \frac{\% WR}{100}\right) \qquad (18)$$

where % WR is the user programmed weld range value, expressed as a percentage of the reference value. For example, if % WR is programmed by the user at 5% and $I_{ref}(\gamma_{upd})$ has been determined to be 100 amperes, the lower and upper limits on weld current would be 95 Amperes and 105 Amperes respectively.

Having computed the allowable weld range from (17) and (18) above, the voltage compensated weld current, $I_{vcu}$ is compared against the limits in P68 and P70 to determine if either of the following conditions is satisfied:

$$I_{vcu} < I_{wrl} \qquad (19)$$

or $$I_{vcu} > I_{wrh} \qquad (20)$$

If $I_{vcu}$ is less than $I_{wrl}$ in or $I_{vcu}$ is greater than $I_{wrh}$ a weld range event is declared for the schedule m in step P74. If neither inequality expressed in (19) or (20) are satisfied, then no weld range event is declared and the system enables an update of dynamic I-γ model in step P72 by setting the appropriate flag UPDATE(m). UPDATE(m) is subsequently used to trigger the impedance estimator function 64 to be described subsequently. After UPDATE(m) has been set in P72, the weld monitor ends in P78.

In the event of declaration of a weld range event in step P74, the state of the dynamic I-γ model is first determined in step P76. If the dynamic I-γ model for the selected schedule is in an initialized state, control is passed to step P72, which sets UPDATE(m) as above, even though the weld range event exists. Otherwise, data that causes a weld range event is not used to update the dynamic I-γ model, and the routine ends in P78.

This process causes the present invention to ignore welds that cause weld range events in maintaining the dynamic I-γ model. In the event that an abrupt change in the load impedance is purposely made, such as when the tool is repaired, the operator has the option to re-initialize the dynamic I-γ model via the operator interface device 14.

Figure 8:
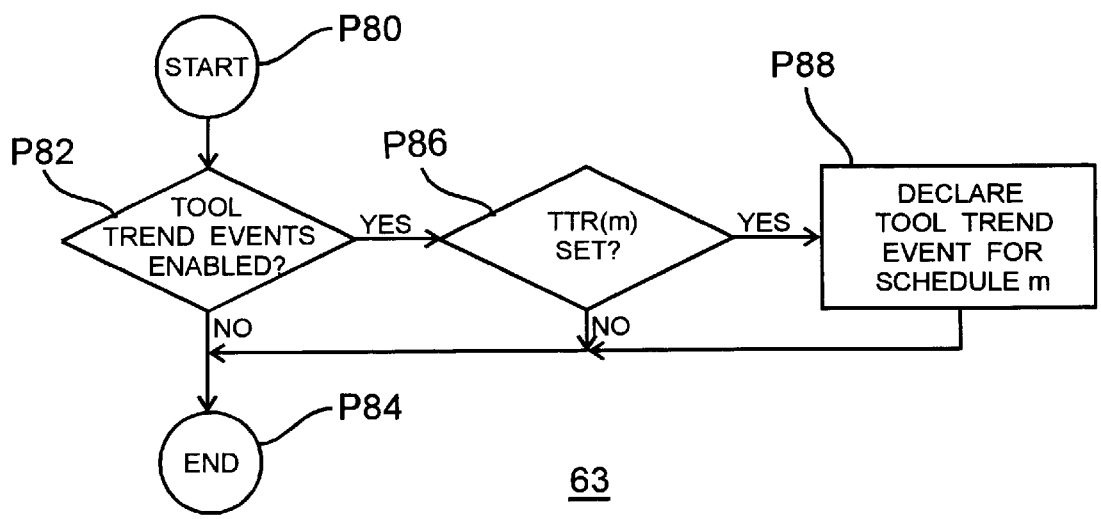
FIG. 8 is a flow chart describing the operation of the tool trend monitor function of FIG. 5.

FIG. 8 is a flow chart describing the operation of the tool trend monitor function 63. The primary function of the tool trend monitor function 63 is to synchronize the presentation of tool trend events with the rest of the events generated by the weld process monitor 53. The routine described in FIG. 8 is executed during the first cycle of the HOLD instruction of the weld schedule. Upon entry to the tool trend monitor routine at P80, the routine determines if the weld sequence controller 37 in step P82 has enabled tool trend events by setting the flag TTE. Tool trend events can be enabled and disabled by the operator via the operator interface device 14. If tool trend events are not enabled, the routine exits at P84. If tool trend events have been enabled, the tool trend flag for schedule m, TTR(m) is tested in step P86 which tests the state of the tool condition flag, TTR(m), to determine if the tool condition monitor 65 has declared a tool trend condition for schedule m. If TTR(m) is not set, the routine exits at P84. If TTR(m) has been set a tool trend event is declared for schedule m in P86, then the routine exits at P84.

Figure 9:
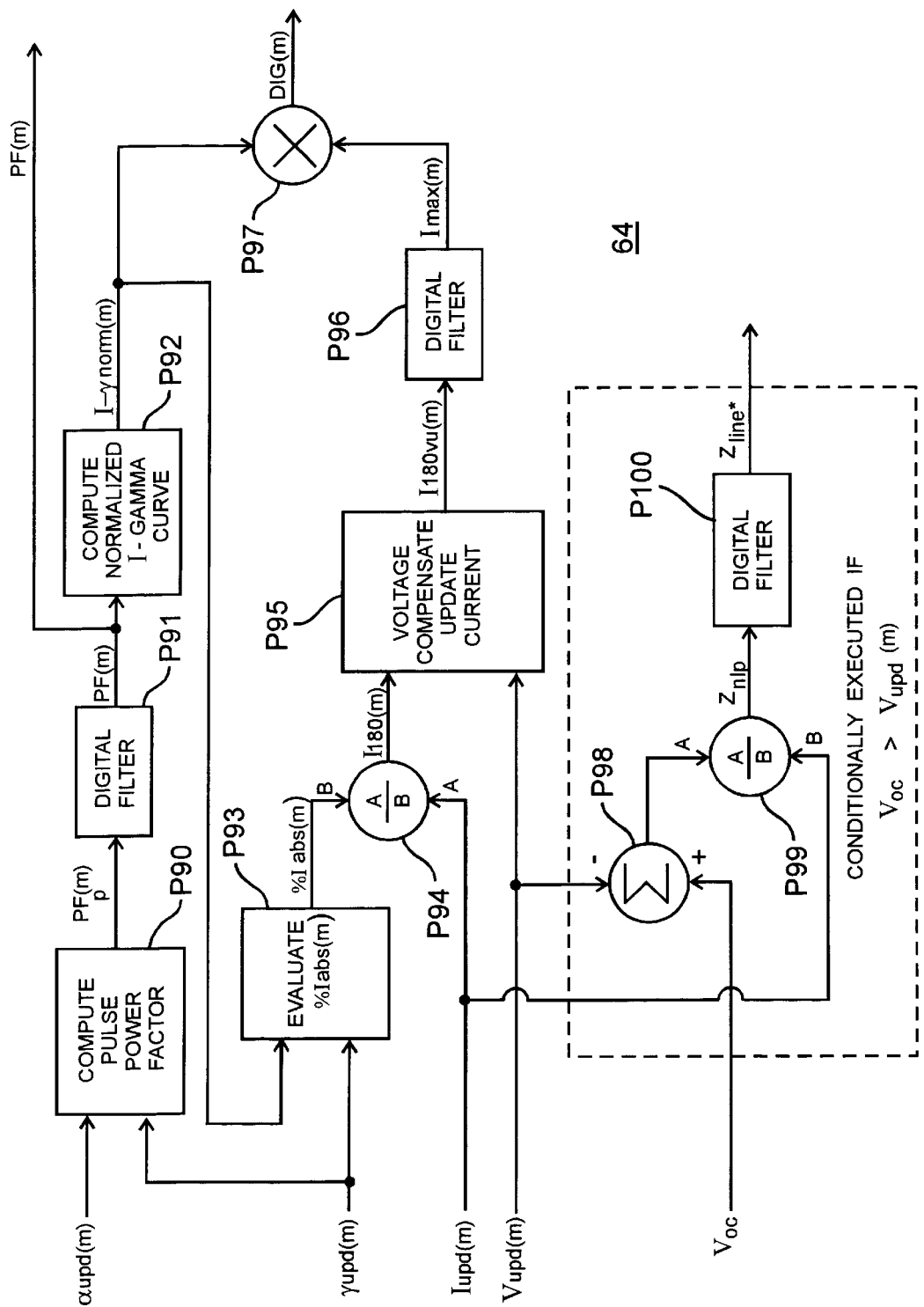
FIG. 9 shows a detailed block diagram of the operation of the impedance estimator function of FIG. 5.

FIG. 9 shows a detailed block diagram of the operation of the impedance estimator function 64. The impedance estimator 64 executes on command from the weld range monitor function 62 via the UPDATE(m) signal, but no time constraints are placed on its execution time. When the impedance estimator function is executed, it uses the input data to update the dynamic I-γ model, DIG(m), estimated power factor of the load impedance, PF(m) and to update the line impedance estimate $Z_{line}$. The operating system for the microcontroller schedules execution of this routine as it can. $\alpha_{upd}$(m) and $\gamma_{upd}$(m) are inputs to a compute pulse power factor function P90. This function utilizes a digitized relation between firing angle, conduction angle and power factor in a table lookup scheme with interpolation to compute the weld load power factor from knowledge of the firing angle and conduction angle. The output of this function is a scalar quantity labeled $PF_p$(m). This scalar power factor forms the input to a digital filter P91, which reduces the weld to weld fluctuations in estimated system power factor. The output of digital filter P91 is the estimated system power factor PF(m) used by the nominal firing angle generator 52 for reducing weld to weld fluctuations in estimated system power factor. The filter in P91 is implemented in the form of a difference equation of the form:

$$x(n+1) = k_{fr} u(n) + (1 - k_{fr}) x(n) \quad (21)$$

where x(n+1) denotes the output of the filter, u(n) denotes the input to the filter, x(n) denotes the filter output value prior to the update and $k_{fr}$ is a constant ranging between 0 and 1. In the present weld controller 10, $k_{fr}$ is presently set to a value of 0.25. The initial value of the filter in the weld 10 is 30%, which represents the lowest value of power factor likely to be seen in the resistance welding application PF(m) is one of the outputs of the dynamic I-γ model estimator.

As stated previously, the dynamic I-γ model for weld schedule m, DIG(m), is represented by a vector of 19 points corresponding to increments of 10 degrees of conduction angle between the ranges of 0 to 180 degrees inclusive. A digitized representation of a relation between conduction angle, normalized weld current and power factor is stored in the microprocessors memory. The estimated power factor PF(m) is an input to a software function P92 that uses a combination of a table lookup and linear interpolation to compute a vector of normalized ly values as a function of the power factor. The output of this function is labeled I-$\gamma_{norm}$(m). I-$\gamma_{norm}$(m) is evaluated at the update conduction angle, $\gamma_{upd}$(m) in P93 to determine the percentage of maximum current represented by the conduction angle. This value is denoted % $I_{abs}$(m).

The estimated current available at 180 degrees conduction angle, $I_{180m}$(m) is determined in step P94 by dividing the actual measured update current, $I_{upd}$(m) by % $I_{abs}$(m). $I_{180m}$(m) is an estimate of the maximum current attainable by the weld controller at full conduction, assuming the voltage source is stiff and at the line voltage measured, $V_{upd}$(m). Since the dynamic I-γ model is defined as the operating characteristic of the weld control at nominal line voltage, $I_{180m}$(m) is scaled in step P95 for the line voltage by multiplying by the ratio of the nominal line voltage to the measured line voltage, $V_{upd}$(p). The output of this voltage compensator is labeled $I_{180vc}$(m). This value is subsequently passed through a digital filter P96 that also takes the form given by (21) in a manner identical to that of the pulse power factor to obtain a maximum current estimate $I_{180}$(m). By multiplying each element of the normalized I-γ table, I-$\gamma_{norm}$(m) by the maximum current estimate $I_{max}$(m) in P97, the dynamic I-γ model estimate for weld schedule m, DIG(m), is obtained.

It is to be noted that the dynamic I-γ model estimate could be made in several other ways without violating the spirit of the present invention. One implementation that has been successfully demonstrated uses the average weld voltage, weld current, firing angle and conduction angle for the last weld pulse in the weld schedule as the update value.

Estimation of the line impedance is made conditionally. The quantity $V_{oc}$ is the last known open circuit voltage, i.e. the line voltage of the last half cycle for which it is known that no weld current flowed. It is assumed that $V_{oc}$ accurately represents the value of the Thevenin equivalent voltage source $V_s$ in the lumped parameter model of FIG. 2, and that value does not change appreciably during the weld pulse. It is recognized in the design that this is not always an accurate assumption, so as an initial test, the difference between the open circuit voltage, $V_{oc}$, and $V_{upd}$(m) is computed in step P98. This should be a positive quantity due to the voltage drop associated with passing current through the line impedance. If the update voltage, $V_{upd}$(m) is greater than or equal to $V_{oc}$, then clearly the value of the Thevenin equivalent voltage source $V_s$ in FIG. 2 has changed considerably and no update of the line impedance estimate is made.

Assuming the open circuit voltage is greater than the update voltage, an estimate of the line impedance, $Z_{nlp}$ for the present weld schedule is computed in step P99 using $$Z_{nlp}(m) = \frac{V_{oc} - V_{upd}(m)}{I_{upd}(m)} \quad (22)$$

This value is filtered through a digital filter P100, the form of which is given by (21) to achieve the estimate of line impedance $Z_{line}$ 48 used in the line impedance compensation calculations.

It is noted that the estimate of line impedance could be made in several other ways without violating the spirit of the invention. One implementation that has been successfully demonstrated uses the average weld voltage and weld current for the pth weld pulse. A second implementation that has been successfully demonstrated uses voltage and current data from the first half cycle of the weld pulse as the update cycle.

Figure 10:
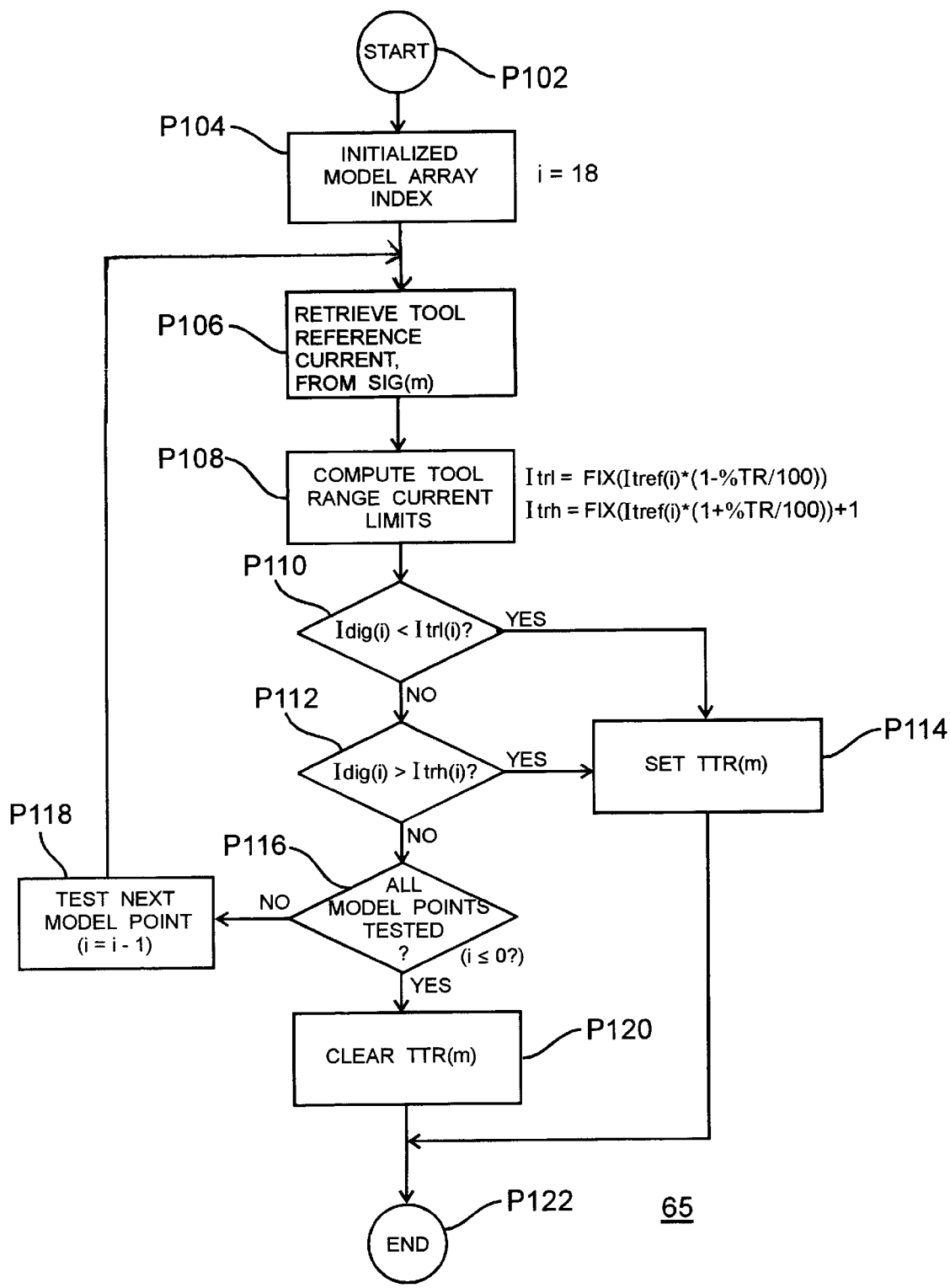
FIG. 10 shows a flow chart of the tool condition monitor function of FIG. 5.

FIG. 10 shows a flow chart of the tool condition monitor function 65. In the present invention, the tool trend monitor function software is executed following the update of a dynamic I-γ model of the system for a given schedule, but not necessarily during the HOLD cycle of the weld schedule. Upon entry to this software routine in step P102, a model array index i is initialized to a value of 18 (step P104), so that when it is used to index the dynamic and static I-γ models, it points to the entry corresponding to 180 degrees conduction angle. The tool reference current, $I_{static}$(i) is computed from the static I-γ model in step P106 and the upper and lower tool trend range current limits corresponding to $I_{static}$(i), labeled $I_{trl}$ and $I_{trh}$ corresponding to $I_{static}$(i) are computed in step P108 using:

$$I_{trl}(i) = \text{fix}\left(I_{static}(i) * \left(1 - \frac{\%TR}{100}\right)\right) - 1 \text{ and} \quad (23)$$

-continued $$I_{trh}(i) = \text{fix}\left(I_{static}(i) * \left(1 + \frac{\%TR}{100}\right)\right) + 1 \quad (24)$$

where the % TR is the tool range percentage specified by the user via the operator interface, and the fix operator in (23) and (24) truncates the magnitude of its argument to the nearest integer value. This is done in the present invention because the static and dynamic I-γ models are stored in integer format, so the limits computed are rounded down and up to the nearest integer respectively, resulting in a finite range of at least one ampere about every point in the static I-γ model.

Once these upper and lower limits have been computed from the static I-γ model, the corresponding data point in the dynamic I-γ model, $I_{dyn}(i)$ is compared against the limits in processing steps P110 and P112 to determine if the $I_{dyn}(i)$ falls within the limits set forth by equations (23) and (24). If the value in the dynamic model $I_{dyn}(i)$ is less than the lower limit $I_{trl}(I)$ the tool trend flag for the present weld schedule, TTR(m) is set in step P114, and this routine is complete and exits at P122. Similarly, if $I_{dyn}(I)$ is greater than the upper limit $I_{trh}(I)$ according to (24), the tool trend flag is set in step P114 and the routine is complete. If $I_{dyn}(I)$ lies within the range specified by $I_{trl}(I)$ and $I_{trh}(I)$, processing proceeds to step P116, where the index is checked to determine if all model points have been tested. If the model index is not zero, the model index is decremented in step P118 and processing proceeds to step P106 where this process repeats for the next point in the I-γ models. If in P104, it is determined that all points on the dynamic I-γ model have been tested (the condition i<0 is satisfied), and all values of the dynamic I-γ model lie within their respective ranges of $I_{trl}(I)$ and $I_{trh}(I)$, processing proceeds to P120, where the tool condition flag for the present schedule m, TTR(m) is cleared and the routine is complete and exits in step P122.

While the specific embodiments have been illustrated and described, numerous modifications are possible without departing from the scope or spirit of the invention. The above description refers to a weld controller application. However, the principles described are readily applicable to any type of control system using voltage phase control, including motor controls such as AC or DC drives, inverters, power supplies, and the like.

We claim:

1. A digital weld control system for a resistance welder supplied from an AC line voltage source comprising:
   A. a phase reference clock for establishing a fundamental time base;
   B. a voltmeter synchronized with the fundamental time base for measuring selected parameters of the AC line voltage source;
   C. a current meter for measuring various parameters of weld load current;
   D. a firing, control synchronized with the fundamental time base;
   E. a weld sequence controller for implementing a weld program by generating weld pulse commands; and
   F. a weld process controller using the generated weld pulse commands to generate a sequence of firing commands sent to the firing control for generating firing pulses to control load current and for maintaining an internal dynamic model of load impedance calculated from the measured selected parameters of the AC line voltage source and weld load current and further including means to generate weld range events when a difference is detected between a measured load impedance and the internal dynamic model of load impedance by a prescribed amount.

2. The digital weld control system of claim 1 wherein the internal dynamic model of load impedance is derived using a lumped parameter circuit model to characterize a relationship between weld load current and a conduction angle of the firing pulses required to achieve the weld load current.

3. The digital weld control system of claim 2 wherein the lumped parameter circuit model comprises an AC line voltage power source, the digital weld control system, and a weld load impedance.

4. The digital weld control system of claim 3 wherein the AC line voltage power source includes the AC line voltage source and a series lumped line impedance which generates a voltage drop proportional to the weld load current.

5. The digital weld control system of claim 3 wherein the weld load impedance includes a weld transformer, a workpiece being welded, cabling, contact tips, and tooling fixtures.

6. The digital weld control system of claim 3 wherein the weld process controller generates the internal dynamic model of load impedance from historical data from a selected weld schedule and uses the internal dynamic model of load impedance along with the measured selected parameters of the AC line voltage source and weld load current in a closed loop feedback system to generate the conduction angle of the firing pulses required to achieve the weld load current.

7. The digital weld control system of claim 6 wherein the weld process controller uses the lumped parameter circuit model and a measured weld load current to determine if the load impedance of a present weld is within a preselected range consistent with the expected weld load current as demanded by the internal dynamic model of load impedance for a particular weld program.

8. The digital weld control system of claim 7 wherein the preselected range of the expected weld load current is set by a user through an operator interface unit coupled to the digital weld control system.

9. The digital weld control system of claim 8 wherein the operator interface unit further allows an user to define a static model of load impedance for a particular weld program.

10. The digital weld control system of claim 9 wherein the static model of load impedance for a particular weld program provides an event indicator when the dynamic load impedance model differs from the static model of load impedance by a preset amount, the event indicator for indicating a tooling breakdown independent of short term workpiece to workpiece variations of load impedance.

11. A digital weld control system for a resistance welder of the type connecting and disconnecting through a welding contactor, a welding transformer load from an alternating current weld power source to control timing periods of a welding sequence and a level of heat intensity in the weld to ensure quality welds, the digital weld control system comprising:
   A. a phase reference clock for establishing a fundamental time base;
   B. a voltmeter synchronized with the fundamental time base for measuring selected parameters of the AC line voltage source;
   C. a current meter for measuring various parameters of weld load current;
   D. a firing control synchronized with the fundamental time base;

E. a weld sequence controller for implementing a weld program by generating weld pulse commands; and F. a weld process controller for establishing a static reference model of load impedance indicative of the intended operation of the weld control system, and for maintaining an internal dynamic model of load impedance calculated from the measured selected parameters of the AC line voltage source and weld load current and means for generating weld control system trend faults when the internal dynamic model of load impedance differs from the static reference model of load impedance by a prescribed amount.

12. The digital weld control system of claim 11 wherein the internal dynamic model of load impedance is derived using a lumped parameter circuit model to characterize a relationship between weld load current and a conduction angle of the firing pulses required to achieve the weld load current.

13. The digital weld control system of claim 12 wherein the lumped parameter circuit model comprises an AC line voltage power source, the digital weld control system, and a weld load impedance.

14. The digital weld control system of claim 13 wherein the AC line voltage power source includes the AC line voltage source and a series lumped line impedance which generates a voltage drop proportional to the weld load current.

15. The digital weld control system of claim 13 wherein the weld load impedance includes a weld transformer, a workpiece being welded, cabling, contact tips, and tooling fixtures.

16. The digital weld control system of claim 13 wherein the weld process controller generates the internal dynamic model of load impedance from historical data from a selected weld schedule and uses the internal dynamic model of load impedance along with the measured selected parameters of the AC line voltage source and weld load current in a closed loop feedback system to generate the conduction angle of the firing pulses required to achieve the weld load current.

17. The digital weld control system of claim 16 wherein the weld process controller uses the lumped parameter circuit model and a measured weld load current to determine if the load impedance of a present weld is within a preselected range consistent with the expected weld load current as demanded by the internal dynamic model of load impedance for a particular weld program.

18. The digital weld control system of claim 17 wherein the preselected range of the expected weld load current is set by a user through an operator interface unit coupled to the digital weld control system.

19. The digital weld control system of claim 18 wherein the operator interface unit further allows an user to define the static model of load impedance for a particular weld program.

20. The digital weld control system of claim 19 wherein the static model of load impedance for a particular weld program provides an event indicator when the dynamic load impedance model differs from the static model of load impedance by a preset amount, the event indicator for indicating a tooling breakdown independent of short term workpiece to workpiece variations of load impedance.

* * * * *